H. G. ECKSTEIN.
METHOD AND APPARATUS FOR POPPING CORN.
APPLICATION FILED NOV. 7, 1906.
904,186.
Patented Nov. 17, 1908.
2 SHEETS—SHEET 1.
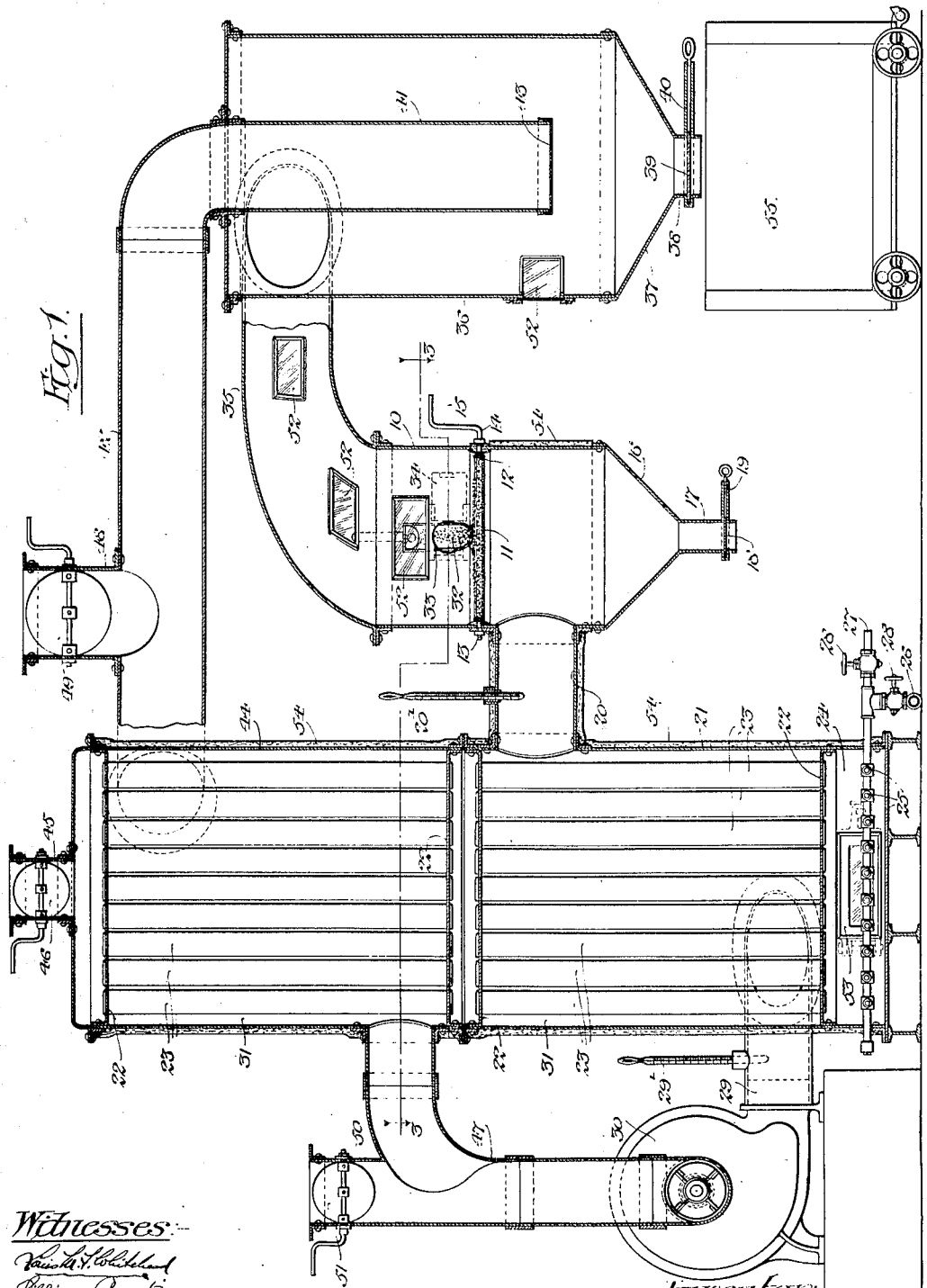

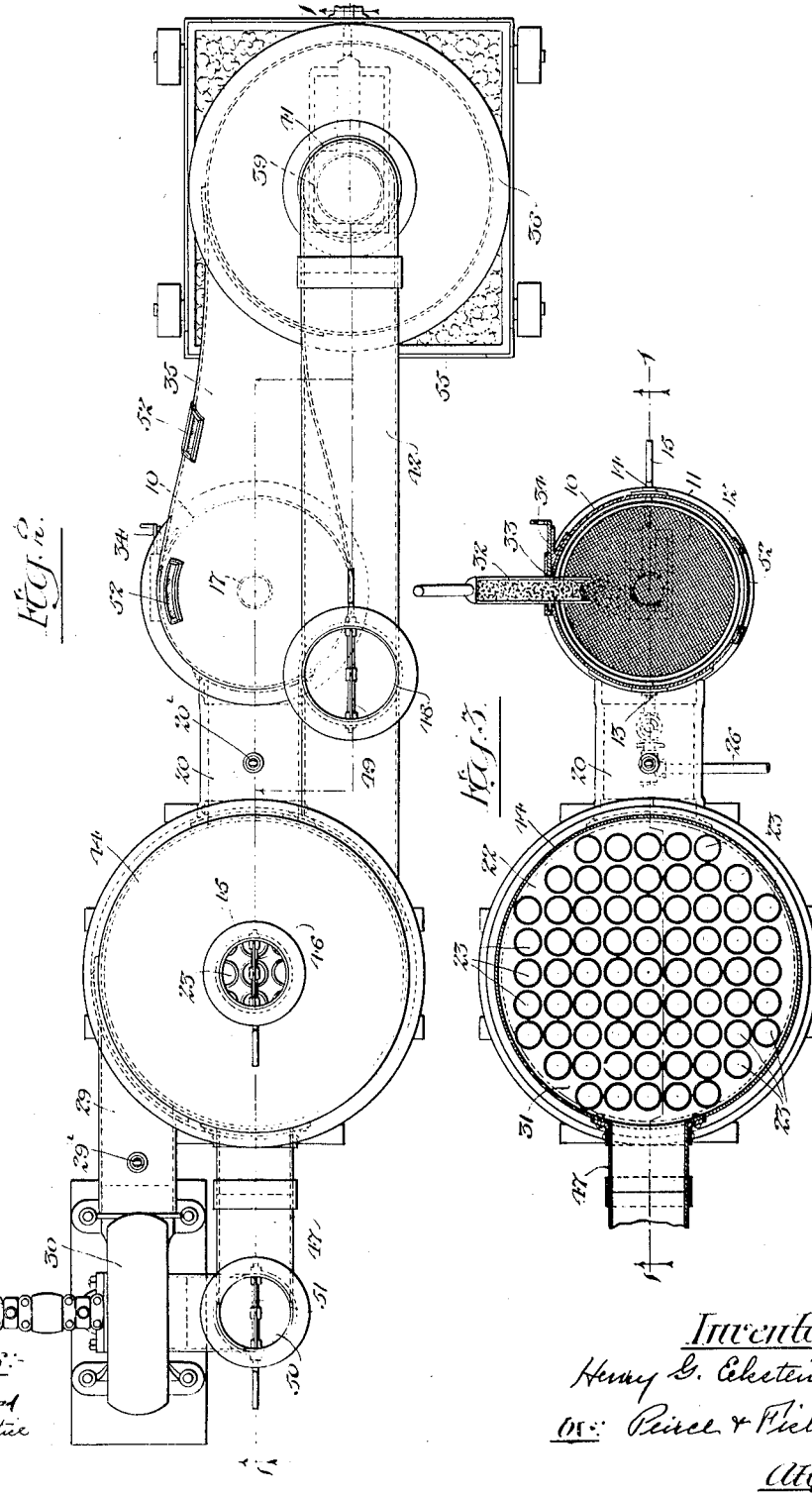

UNITED STATES PATENT OFFICE.

HENRY G. ECKSTEIN, OF CHICAGO, ILLINOIS.

METHOD AND APPARATUS FOR POPPING CORN.

No. 904,186.　　　　　Specification of Letters Patent.　　　　Patented Nov. 17, 1908.

Application filed November 7, 1906. Serial No. 342,346.

*To all whom it may concern:*

Be it known that I, HENRY G. ECKSTEIN, a citizen of the United States, and a resident of Chicago, county of Cook, and State of Illinois, have invented certain new and useful Improvements in Methods and Apparatus for Popping Corn, of which the following is a specification.

The invention relates to popping corn and seeks to provide a novel method and apparatus by which corn in large quantities may be popped with great economy in the amount of fuel used and in which the corn is removed from the popping chamber as soon as it has popped so that it is preserved in its best condition.

To preserve popped corn in its best condition, it should be removed from the hot popping chamber or receptacle as soon as it is popped, for if subjected for any length of time to the temperature in the popping chamber, it quickly becomes dry and tough or even charred. Machines for popping large quantities of corn are usually provided with mechanical separators for removing the popped corn. Such mechanical means cannot however, act instantaneously and moreover, the corn frequently becomes clogged therein and is charged or blackened by the heat in the popping chamber.

In accordance with the present improved method, the corn is subjected in a suitable popping chamber or receptacle to a blast of hot gaseous medium (air, steam or the like) of sufficient strength to remove the corn from the chamber the instant it is popped, so that it is preserved in its best condition.

The invention consists in the novel features and in the improved apparatus thereinafter set forth, illustrated in the accompanying drawings and more particularly pointed out in the appended claims.

In the drawings, Figure 1 is a longitudinal section of the improved apparatus employed, the parts being shown in section on the lines 1—1 of Figs. 2 and 3. Fig. 2 is a plan view of the same and Fig. 3 is a partial horizontal section on line 3—3 of Fig. 1.

All parts of the apparatus are preferably formed of sheet iron or steel. The popping chamber 10 is preferably cylindrical, as shown, and is arranged in upright position. It is provided mid-way between its ends with a horizontal screen 11 of fine mesh, for supporting or carrying the unpopped corn. The screen is preferably mounted in a ring frame 12 which fits quite snugly within the cylindrical popping chamber 11, and which is carried at diametrically opposite points on pintles 13 and 14, journaled in the walls of the popping chamber. One of the pintles is extended to form a handle 15 so that the screen may be tilted at intervals to discharge the waste corn which cannot be popped. The conical bottom 16 of the popping chamber is provided at its lower end with a spout 17 having a slide valve 18 which fits substantially air-tight within suitable guides 19 carried by the spout. Valve 18 may be opened at intervals to permit the discharge of the waste corn from the popping chamber.

The popping chamber is provided below the screen with an inlet for gaseous medium and above the screen with an outlet, and suitable means are provided for forcing a blast of air, steam or the like through the popping chamber which will be of sufficient strength to blow the popped corn (which of course is of much lighter gravity than the unpopped corn) out of the popping chamber as soon as it is formed. Any suitable means may be provided for effecting the passage of the blast of gaseous medium through the popping chamber. In the apparatus shown, a short inlet pipe 20 opens into the chamber immediately below the screen. This pipe leads from the heater 21, which consists of an upright, cylindrical shell having heads 22 between which are arranged a series of flues or pipes 23 for the passage therethrough of the combustion gases from the fire box 24 at the base of the heater. Any suitable form of fuel may be used but preferably, the fire box is provided with a suitable form of Bunsen burner. That shown consists of a series of perforated pipes 25 of usual construction and which communicate with the air and gas supply pipes 26 and 27. The supply pipes are provided with valves 28 so that the temperature may be nicely controlled.

The air is supplied to the heater by a pipe 29 which leads from a fan or blower 30, and which opens tangentially into the lower end of the chamber 31 of the heater that is formed by the shell thereof and the heads 22, and through which the flue pipes 23 pass. The inlet pipe 20 of the popping chamber leads from the upper end of the heating chamber 31. When the fan is operated, air is forced into the heating chamber 31 through the tangential pipe 29 and circulates about the flue pipes 23 so as to be rapidly heated by the hot gases of combustion passing therethrough. Thermometers 29' and 20' are arranged in pipes 29 and 20 at opposite ends of the heater chamber 31, so that the supply of air and gas to the heater may be nicely regulated to maintain the air blast delivered to the popping chamber at the proper temperature. The air delivered to the popping chamber should be heated to 450 or 500 degrees Fahrenheit. The hot blast thus delivered to the popping chamber beneath the screen 11, agitates the unpopped corn thereon so that it is thoroughly and uniformly heated, and as soon as the corn is popped it is carried out of the popping chamber by the blast. Other forms of heaters could be employed and steam or other gaseous medium could be used in place of the air blast.

The popping chamber is charged at intervals with unpopped corn by means of a suitable scoop 32 which may be inserted in a charging inlet 33 in the side wall of the chamber immediately above the screen 11. The charging inlet 33 is normally closed so as to be substantially air-tight by a slide valve 34.

The blast of air or other gaseous medium passes from the popping chamber through a laterally extending deflector or outlet pipe 35 which communicates with a receptacle 36. This receptacle is preferably in the form of a separator so that the heated medium may be returned for reuse in the popping chamber and thus avoid waste of the heat contained therein. Any suitable form of separator may be employed. That shown consists of a cylindrical upright casing, into the upper end of which the pipe 35 discharges in tangential direction so that the popped corn and air blast circulates spirally therethrough and the popped corn separated from the blast by centrifugal force.

The separator is closed at its upper end and provided at its lower end with a conical bottom 37 having an outlet spout 38 which is closed by a valve 39 sliding in guides 40, and through which the popped corn is discharged, either at intervals or continuously, as desired. An outlet pipe 41 leads from the bottom of the separator to a return pipe 42 by which the air is carried back to the fan or blower 30 to be returned thereby, re-heated and again forced through the popping chamber. The lower end of the pipe 41 is covered with a screen 43 of fine mesh so that none of the popped corn will be carried therethrough.

Pipe 42 preferably first leads to a supplemental heater 44 which is similar in construction to the main heater 21 and is provided with heads 22 and flue pipes 23 and with an air space 31. This heater is arranged above the main heater 21 so that the gaseous products of combustion from the fire box passes successively through the flues 23 of the main and supplemental heaters 21 and 44. An outlet pipe 45 leading from the top of the supplemental heater is provided with a damper 46 to regulate the draft through the main and supplemental heaters. Pipe 42, as shown, opens tangentially into the upper end of the air space 31 of the supplemental heater, and a pipe 47 leads from the lower end of the chamber of the supplemental heater to the inlet of the fan or blower 30. By this arrangement, an endless conduit or passage is provided for the circulation of the air or other gaseous medium, so that there will be little waste of heat. If this endless passage were closed at all points an excessive pressure might be generated therein due to the formation of steam from the moisture contained in the corn. For this reason, a suitable vent pipe 48 having a controlling valve or damper 49, is provided and is preferably arranged, as shown, in the pipe 42 adjacent the supplemental heater 44. To supply fresh air to the endless passage through the heaters, popping chamber and separator, an inlet pipe 50 having a regulating valve or damper 51 opens into the pipe 47 that leads to the inlet of the fan or blower 30. In the operation of the apparatus, the valves 49 and 51 will be set almost to their closed position but may be regulated as is desired or necessary.

In order that the operation of the apparatus may be observed, the popping chamber 10 and the outlet pipe 35 are provided with view openings or windows 52 sealed or covered with transparent sheets of mica. The lower end of the separator is also provided with a similar view opening. The fire box 24 of the heater is shown provided with a door 53 having a transparent sheet of mica set in an opening therein.

By the use of the improved method and apparatus set forth, large quantities of corn may be popped with great rapidity and with marked economy in the amount of fuel used. The temperature in the popping chamber can be readily maintained at the desired degree and the whole operation controlled with great nicety. The corn is removed from the intense heat in the popping chamber the instant it is popped and is thus obtained in fresh, crisp condition and devoid of charred or blackened portions. To avoid loss of heat, the popping chamber and heaters 21 and 44 are preferably provided with a covering 54 of suitable insulating material. The separator 26 is however, preferably left unprotected in this manner since the temperature therein is desirably much lower than in the popping chamber in order to avoid any possible injury to the freshly popped corn. From the separator the popped corn is readily delivered into a receptacle 55 placed beneath the discharge pipe 38. As stated, other forms of apparatus may be employed in carrying out the improved method. For example, other forms of heaters could be used and the air could be replaced by super-heated steam or other gaseous material. Preferably however, the heater is provided with separate passages for the air or steam and for the products of combustion, as in the arrangement shown, so that the popped corn will not be subjected or brought in contact with any of the combustion gases and will have therefore, a better taste and flavor than corn manufactured in the usual manner.

It is obvious that numerous changes may be made in the details set forth without departure from the essentials of the invention.

Having described my invention, what I claim as new and desire to secure by Letters Patent, is:—

1. The method of popping corn which consists in sustaining the unpopped kernels in a suitable popping chamber and there subjecting the same to the action of a hot blast of gaseous medium of sufficient high temperature to pop the kernels and of sufficient volume and velocity to simultaneously eject the popped kernels as soon as formed from the popping chamber.

2. The method of popping corn which consists in sustaining the unpopped kernels in position and subjecting the same to the action of a hot blast of gaseous medium projected through the charge at high temperature sufficient to pop the kernels, and simultaneously removing the popped kernels from the rest of the charge by the force and volume of the blast, substantially as described.

3. The method of popping corn which consists in sustaining the unpopped kernels in a suitable popping chamber and there subjecting the same to the action of a hot blast of gaseous medium projected through the charge at high temperature sufficient to pop the kernels and simultaneously removing the popped kernels from the popping chamber by the force and volume of the blast, substantially as described.

4. The method of popping corn which consists in sustaining the unpopped kernels in a suitable popping chamber and there subjecting the same to the action of a hot blast of air or steam projected through the charge at high temperature sufficient to pop the kernels, simultaneously removing the popped kernels from the popping chamber by the force and volume of the blast, separating the popped corn from the blast of hot air or steam and returning the latter for re-use in the popping chamber, substantially as described.

5. The method of popping corn which consists in subjecting the unpopped kernels retained *in situ* to the action of a hot air blast projected through the charge at high temperature sufficient to pop the kernels, simultaneously removing the popped kernels from the rest of the charge by the force and volume of the blast, later withdrawing the popped corn from the air current by means of a cyclonic whirl imparted thereto and finally heating said confined current preparatory to blasting it again into the confined charge, substantially as described.

6. In an apparatus for popping corn, the combination of a popping chamber having a screen for supporting the unpopped corn and provided with an inlet for gas or vapor below said screen and an outlet above the same and means for forcing a hot blast of gaseous medium through said chamber to pop the corn and effect the removal of the popped corn therefrom.

7. In an apparatus for popping corn, the combination of a popping chamber having a supporting screen therein for the unpopped corn and provided with an inlet for gas or vapor below said screen and an outlet above the same and means for forcing through said chamber a hot blast of gaseous medium to agitate and pop the corn and effect the removal of the popped corn therefrom and means for removing the waste corn from said popping chamber.

8. In an apparatus for popping corn, the combination of a popping chamber having a tilting screen therein for supporting the unpopped corn and provided with an inlet for air or gas below said screen and an outlet above the same, and means for forcing a hot blast of gaseous medium through said chamber to pop the corn and effect the removal of the popped corn therefrom, said chamber having a valved outlet for waste corn below said screen.

9. In an apparatus for popping corn, the combination of a popping chamber having a tilting screen therein for supporting the unpopped corn and provided with an inlet for air or gas below said screen and an outlet above the same, and means for forcing a hot blast of gaseous medium through said chamber to agitate and pop the corn and effect the removal of the popped corn therefrom, said chamber having a valved outlet for waste corn below said screen and a valved charging inlet above the screen.

10. In an apparatus for popping corn, the combination of a heater having a suitable supporting screen for the unpopped corn, an inlet for gaseous medium below said screen and an outlet above the same, a heater communicating with said inlet and means for forcing through said heater and said chamber, a blast of air or steam to pop the corn and remove the popped corn from said popping chamber.

11. In an apparatus for popping corn, the combination of a popping chamber having a suitable supporting screen for the unpopped corn, an inlet for gaseous medium below said screen and an outlet above the same, a heater communicating with said inlet and means for forcing through said heater and said chamber a blast of air or steam to pop the corn and remove the popped corn from said popping chamber, said heater having separate passages therethrough for the blast of air or steam and for the products of combustion.

12. In an apparatus for popping corn, the combination of a popping chamber having a screen therein for supporting the unpopped corn, of means for forcing a blast of gaseous medium through said chamber and through the supporting screen therein to pop the corn and remove the popped corn therefrom and a separator communicating with said popping chamber to effect the removal of the popped corn from the blast of gaseous medium.

13. In an apparatus for popping corn, the combination of a popping chamber having a screen therein for supporting the unpopped corn, means for forcing a hot blast of gaseous medium through said chamber and through the supporting screen therein to pop the corn and to remove the popped corn therefrom, a separator communicating with said popping chamber for removing the popped corn from the blast of gaseous medium and means for returning the latter for reuse in said popping chamber.

14. In an apparatus for popping corn, the combination of a popping chamber having a screen for supporting the unpopped corn and provided with an inlet and an outlet on opposite sides of said screen, a heater communicating with said inlet, a separator communicating with said outlet and means for maintaining gaseous medium in endless circulation through said heater, popping chamber and separator to pop the corn and carry the same from said chamber to said separator.

15. In an apparatus for popping corn, the combination of a popping chamber having a supporting screen for unpopped corn provided with an inlet and an outlet on opposite sides of said screen, a heater communicating with said inlet, a separator communicating with said outlet, means for forcing a blast of gaseous medium through said heater, said popping chamber and said separator to agitate and pop the corn and carry the popped corn from said chamber to said separator, and a return pipe leading from said separator said blast generating means, whereby an endless passage for the circulation of gaseous medium is formed.

16. In an apparatus for popping corn, the combination of a popping chamber having a supporting screen for the unpopped corn and an inlet and an outlet on opposite sides of said screen, a heater communcating with said inlet, a separator communicating with said outlet, a blower for maintaining a blast of air through said heater, said popping chamber and said separator to pop the corn and carry the popped corn from said chamber to said separator, a return pipe leading from said separator to said blower whereby an endless passage for the circulation of air is formed, means for venting said passage and means for supplying fresh air thereto.

17. In an apparatus for popping corn, the combination of a popping chamber having a supporting screen for unpopped corn and provided with an inlet and outlet on opposite sides of said screen, a heater communicating with said inlet, a separator communicating with said outlet, a blower for forcing the blast of air through said heater, said popping chamber and said separator to pop the corn and carry the popped corn from said chamber to said separator and a return pipe leading from said separator to said blower, said separator having a valved outlet for the discharge of the popped corn and said popping chamber having a valved outlet for the discharge of waste corn.

18. In an apparatus for popping corn, the combination of a popping chamber having a supporting screen for the unpopped corn and provided with an inlet and an outlet on opposite sides of said screen, a heater communicating with said inlet, a separator communicating with said outlet, a blower for maintaining a blast of gaseous medium through said heater, said popping chamber and said separator to pop the corn and carry the popped corn from said chamber to said separator, a return pipe leading from said separator to said blower and a supplemental heater interposed in said return pipe.

19. In an apparatus for popping corn, the combination of a popping chamber having a supporting screen for the unpopped corn and provided with an inlet below said screen and an outlet above the same, a main heater communicating with said inlet, a separator communicating with said outlet, a blower for maintaining a blast of air through said heater, said popping chamber and said separator to pop the corn and carry the popped corn from said chamber to said separator, a return pipe leading from said separator to said blower and a supplemental heater interposed in said return pipe, said main and supplemental heaters having flues for the successive passage therethrough of the gases of combustion.

HENRY G. ECKSTEIN.

Witnesses:
LILLIAN PRENTICE,
KATHARINE GERLACH.